(12) United States Patent
Vehviläinen

(10) Patent No.: US 6,504,873 B1
(45) Date of Patent: Jan. 7, 2003

(54) FILTERING BASED ON ACTIVITIES INSIDE THE VIDEO BLOCKS AND AT THEIR BOUNDARY

(75) Inventor: Markku Vehviläinen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/094,177

(22) Filed: Jun. 9, 1998

(30) Foreign Application Priority Data

Jun. 13, 1997 (FI) .................................................. 972508

(51) Int. Cl.⁷ ................................................. H04N 7/12
(52) U.S. Cl. ................................................. 375/240.29
(58) Field of Search ....................... 375/240.01, 240.24, 375/240.26, 240.29; H04N 7/12

(56) References Cited

U.S. PATENT DOCUMENTS

| | | | |
|---|---|---|---|
| 4,754,492 A | 6/1988 | Malvar | 382/41 |
| 4,941,043 A | 7/1990 | Jass | 358/133 |
| 5,229,864 A | 7/1993 | Moronaga et al. | 358/433 |
| 5,337,088 A | 8/1994 | Honjo | 348/420 |
| 5,367,385 A | 11/1994 | Yuan | 358/465 |
| 5,422,964 A | 6/1995 | Devimeux et al. | 382/226 |
| 5,619,267 A | 4/1997 | Riegel et al. | 348/400 |

FOREIGN PATENT DOCUMENTS

| | | |
|---|---|---|
| DE | 19605418 A1 | 8/1997 |
| EP | 0 560 533 A3 | 9/1993 |
| EP | 0 750 427 A2 | 12/1996 |
| EP | 0772365 A2 | 5/1997 |
| EP | 0 776 133 A2 | 5/1997 |
| WO | WO 97/36419 | 10/1997 |

*Primary Examiner*—Young Lee
(74) *Attorney, Agent, or Firm*—Perman & Green, LLP

(57) ABSTRACT

The invention relates to a filtering method used for a video signal at the receiver. It is mostly suited for video compression algorithms utilizing DCT-based video compression technology. In the invention the boundaries (49) between adjacent video blocks (B5 and B6) are filtered based on the amount of activity inside the adjacent video blocks and the activity at the boundary between the adjacent video blocks. If the filtering according to the invention is performed, it is focused to a certain number of bits (42, 43, 44, 45, 46, 47) close to the boundary (49). The filtering is done by adjusting the numerical values of each video pixel close to the boundary towards a reference line, which is defined as a linear equation leading from the numerical value of a first reference pixel (41) to the numerical value of a second reference pixel (48). The reference pixels (41, 48) are selected from the adjacent video blocks to present the smooth movement over the boundary between the adjacent video blocks (B5 and B6).

14 Claims, 7 Drawing Sheets

FILTERING BASED ON ACTIVITIES INSIDE THE VIDEO BLOCKS AND AT THEIR BOUNDARY

FIELD OF THE INVENTION

The present invention relates to a filtering method and a filter, which are used in connection with digital video transmission. The filtering is performed at the receiver side, and the method is especially suitable to be used in connection with mobile terminals and other terminals operating at relatively low transmission line rates.

BACKGROUND OF THE INVENTION

Nowadays video signals are increasingly transferred in different digital formats. The digital formats use the transmission band width more efficiently than analog formats. Today's video compression standards, like H.261, H.263, MPEG-1 and H.262 (MPEG-2), define a bit string syntax and a decoder structure, but not an encoding algorithm or apparatus. Thus, different encoders may, and are likely to, produce different bit strings, given the same input sequence and the same target bit rate. This freedom in the encoding of a video sequence gives prospects for achieving better quality of the coded video by application of more sophisticated encoding strategies, in the framework of the standards.

Even if the decoder structure as a whole is defined, there are still many procedures in which the codec manufacturers have the possibility to realize the decoder in a different way. One such a freedom is filtering of the received video signal at the decoder side. The filtering has a significant influence on the quality of the video picture, especially when operating at low transmission line rates and with coding standards utilizing Discrete Cosine Transform (DCT) based technology. It is characteristic to the DCT- based video codecs that the video signal is coded in quadratic sections (generally known as blocks or video blocks, formed, e.g., of 8*8 or 16*16 video pixels) of the video picture, and that the boundaries between the different video blocks after decoding appear visible impairing the quality of the video signal presented, e.g., on a video monitor or video projector. These kind of coding errors, like some other types of coding errors, will here be called artefacts.

Patent publication U.S. Pat. No. 5,619,267 describes one possible way of implementing a filtering process at the decoder side. The described embodiment uses H.261 standard video coding technology, the general operation of which is known to a person skilled in the art, and has been described in said patent publication (more exactly in column 1, line 7 to column 2, line 39). The patent publication presents a filtering method, which utilizes the H.261 standard based in-block filtering method (column 2, lines 18–34) also for filtering the boundaries between adjacent video blocks. This is done by shifting the video memory addresses in horizontal and vertical dimension, e.g., by 4 pixels, and repeating the standard filtering process for all the video pixels or for only the pixels located directly at the edge of the adjacent video blocks (column 4, line 53—column 5, line 37).

One significant disadvantage of filtering is that the sharpness of the video picture is reduced. The optimal picture quality can be obtained with a filter having an adjustable efficiency by which a compromise in video picture quality can be worked out so that the artefact generally called "blocking effect" is not too visible and the picture is still sharp enough. The optimal filtering degree is also a function of the amount of movement in the video picture and the available transmission line rate. The filtering method described in the patent publication U.S. Pat. No. 5,619,267 is not adjustable, so it can not be optimally used in reference to the quality of the video picture.

Patent publication U.S. Pat. No. 4,941,043 presents a filtering method, in which the degree of filtering at the decoder is adjusted on basis of the frequency limitation that was made for each video block at the encoder side. This method requires the transmission of side information for each encoded video block from the transmitter to the receiver. This reduces the video compression efficiency and makes the method unsuitable for the already established video compression algorithms, such as H.261.

SUMMARY OF THE INVENTION

Now a novel adaptive filtering method for a video picture has been invented with which the above mentioned drawbacks can be reduced. One object of this filtering method is to reduce blocking artefacts without significantly degrading the picture resolution. This is realized by shifting the numerical values of boundary samples, i.e. the numerical values describing the luminance and chrominance information of video pixels close to the boundary between adjacent video blocks, to the reference line, not by low-pass filtering. The reference line is graphically a straight line which is drawn from the numerical value of one reference video pixel in one of the adjacent video blocks to the numerical value of another reference video pixel from the other of the adjacent video blocks over the boundary between the blocks, where the straight line (reference line) is formed as a function of place of video pixel and its numerical value. The video pixels are selected so that the pixels on which the filtering is performed will be located between the above mentioned reference pixels. Depending on the distance from the boundary between the adjacent video blocks, the numerical values of each video pixel, to which filtering according to the invention is performed, is directed towards the reference line in such a way that the closer the video pixel is to the boundary, the more the numerical value is directed towards the reference line. This reduces the disappearance of the resolution in the picture in the filtering process according to the invention because the adjacent video pixels as such are not filtered in comparison with each other but are adjusted in comparison to the reference line.

If there is lot of activity inside two adjacent video blocks, and at the boundary between them, that part of video frame most probably includes important information, and filtering at that area should be outlined to the minimum or completely omitted. On the other hand, if there is no or very little (probably just noise) activity in that area, the area is supposed to be "smooth" (e.g., a wall of one color), and an efficient filter can be used for a relatively large area to minimize the visible blocking effect, which is as it's worst just at the "smooth" areas. In one embodiment, later described in more detailed, three different branches are used for classification of the different picture areas: "smooth", "moderate", and "high activity", and the filter is adjusted accordingly. The same conditional equation is used to determine if the filtering according to the invention is applied at the boundary under examination, and in positive conclusion to select the used filtering method.

According to a first aspect of the present invention there is provided a method of filtering a received video picture, in which a digital video picture is received, the video picture comprising video blocks, each video block comprising a certain amount of individual video pixels, each video pixel having a numerical value defining a property of the video pixel and having a certain location in the video picture, and in which video picture a first video block and a second video block located adjacent the first video block define a boundary therebetween, a first video pixel from the first video block and a second video pixel from a second video block are selected in such a way that they are adjacent each other on the opposite sides of the boundary, and the first video pixel and the second video pixel are filtered, wherein a first reference video pixel is selected in the first video block and a second reference video pixel is selected in the second video block in such a way that the first reference pixel, the first video pixel, the second video pixel and the second reference pixel are situated on a straight line, perpendicular to the boundary, drawn from the first reference video pixel to the second reference video pixel, a linear equation is defined, the linear equation giving as a solution a numerical reference value to each pixel on said straight line as a function of the location of the pixel on said straight line, and the filtering is performed by adjusting the numerical value of the first video pixel towards its reference value, and by adjusting the numerical value of the second video pixel towards its reference value.

According to a second aspect of the present invention there is provided a terminal device for filtering a received video picture, which video picture comprises video blocks, each video block comprises a certain amount of individual video pixels, each video pixel having a numerical value defining a property of the video pixel and having a certain location in the video picture, in which video picture a first video block and a second video block located adjacent the first video block define a boundary therebetween, and the terminal device comprising first selecting means for selecting a first video pixel from the first video block and a second video pixel from a second video block in such a way that they are adjacent each other on the opposite sides of the boundary, wherein it further comprises second selecting means for selecting a first reference video pixel in the first video block and a second reference video pixel in the second video block in such a way that the first reference pixel, the first video pixel, the second video pixel and the second reference pixel are situated on a straight line, perpendicular to the boundary, drawn from the first reference video pixel to the second reference video pixel, defining means for defining a linear equation, the linear equation giving as a solution a numerical reference value to each pixel on said straight line as a function of the location of the pixel on said straight line, and adjusting means for filtering the first video pixel and the second video pixel by adjusting the numerical value of the first video pixel towards its reference value, and the numerical value of the second video pixel towards its reference value.

DETAILED DESCRIPTION OF THE INVENTION

This invention is especially targeted to H.261 and H.263 standard like block based codecs, i.e., to codecs whose channel bit rate settles around 20 kbit/s–2 Mbps and utilize Discrete Cosine Transform (DCT) with quantization, Motion Compensation (MC), and/or Differentiation Pulse Code Modulation (DPCM) coding methods. Each artefact can easily be addressed to be caused by one of the before mentioned three coding methods. An aim of this invention is the improvement of reconstruction of pictures (video frames) in the receiving end, which is depicted as post-processing in FIG. 1.

Figure 1:
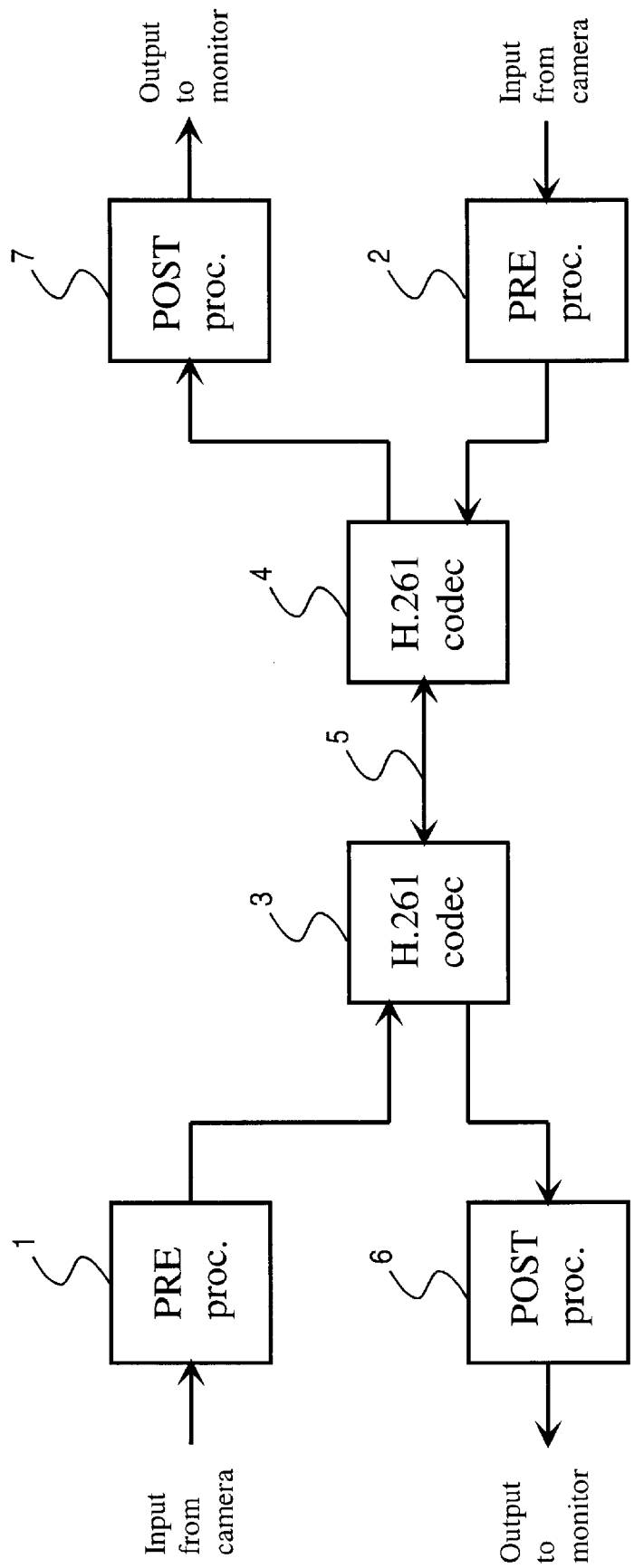
FIG. 1 presents a general structure of a two-way (full duplex) video transmission system utilizing H.261 video compression method as a block diagram.

FIG. 1 presents a principal structure of a H.261 standard based two-way (full-duplex) video transmission system known to a person skilled in the art. It comprises, among other things, pre-procession sections 1 and 2 at both ends. Video signals to be transmitted are connected to the pre-procession sections 1 and 2, in which an optional pre-filtering is performed. The video signals are further supplied to the transmitting parts of the codecs 3 and 4. The codecs 3 and 4 are connected to each other by, e.g., using a digital telephone network, like ISDN (Integrated Services Digital Network, ref. 5). The received video signals are supplied to the post-processing sections 6 and 7 at both ends. So, artefacts taken an interest in connection to the present invention are mainly alleviated by the reconstruction enhancement in the post-processing sections 6 and 7 of the receiving ends. The use of the invention preferably needs neither any information from the transmitter end (causes no extra load to the transmission channel) nor requires any modifications to the existing video compression standards.

The lower the bit rate of the transmission channel, the more visible coding artefacts introduced by the codec will become. In case of compression applications of lower than 1,5 Mbit/s (H.261, H.263, and MPEG-1) bit rates, a great deal of artefacts exist. The noise distribution is often high tailed and has high frequencies which causes disturbing effects since the HVS (Human Visual System) is very sensitive to high abrupt changes. In very low bit rate systems, like H.261 and H.263, a frame rate is typically far below 30 or 25 fps (frames per second) which introduces an additional artefact into moving objects. This is called as motion judder or jerky motion portrayal which exists in systems under or equal to 15 fps. Visually the most dominant artefact is the blocking effect (also called mosaic effect) in smooth areas, and it is typically the more disturbing the lower the achieved video frame rate. The blocking effect is defined as the discontinuity of video block boundaries. The block-like shape of the distortion becomes more visible in the smooth areas of the video picture because it does not appear at object boundaries in the picture.

The filtering according to the invention is done independently for each luminance or color signal: for red (R), green (G) and blue (B) signals in RGB-format based video codecs, for luminance (Y), and for color difference signals (U and V) in YUV-format based video codecs and only for luminance (Y) in black and white based video codecs. The filtering method according to the invention is identical for each signal. Therefore, in the following, the invention will be described in view of one signal, being it here the Y (luminance) signal. The connection between the different video signals can be detected from the following approximated equations (1) known to a person skilled in the art:

$$Y = 0.30R + 0.59G + 0.11B \quad (1)$$
$$V = 0.51R - 0.42G - 0.08B$$
$$U = -0.17R - 0.34G + 0.51B$$

To reduce the blocking effect at the boundary between two adjacent video blocks a certain number of video pixels close to the boundary from both the video blocks are taken under the filtering process. Depending on the activity of the picture inside the two blocks and on the activity of the picture at the boundary between the adjacent two video blocks, the number of video pixels to which the filtering according to the invention is performed is adjusted. In this context the activity of a certain picture area means how much do the numerical values indicating the luminance level of individual video pixels differ from each other inside that area. After the decision of the amount of video pixels to which the filtering is performed, the numerical values (e.g., luminance value given with 8 bits, i.e., 0–255 in decimal format) of the selected video pixels are directed towards the reference line, The reference line defines the average steepness in the change of the numerical values of the adjacent video pixels when moving from one video block to another over the boundary between them. The reference line is described in more detail in connection to the description of FIGS. 3A, 3B, 3C, 3D, 3E, 3F and 4.

Figure 2A:
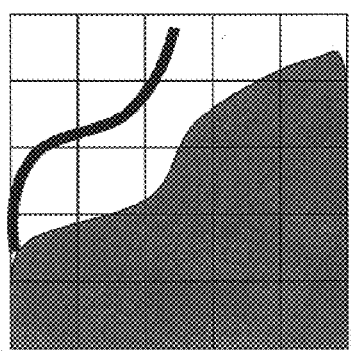
FIGS. 2A and 2B present a part of a video frame before and after compression, and artefacts generated during the process.
Figure 2B:
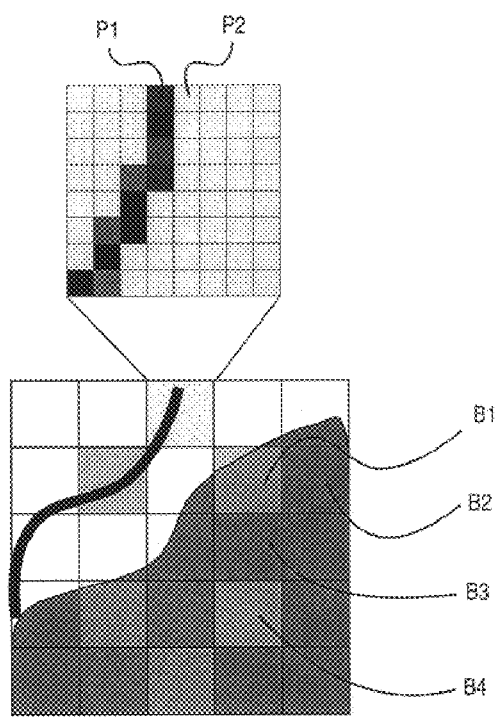

FIG. 2A presents a part of one original video frame, and FIG. 2B presents the same part after encoding and decoding the same frame. The video frame includes 5*5 video blocks, and each video block consists of 8*8 video pixels as shown in FIG. 2B. These two illustrative figures present only the luminance (Y) part of a video frame, but the same principal is used also for color-difference signals (U) and (V) in YUV-based video systems, and for separate color signals in RGB-based systems, as mentioned before.

It is characteristic to the DCT-coding that if several adjacent video pixels, like pixels P1 and P2 (FIG. 2B), differ from each other significantly inside one block, the coding of that block produces more bits, i.e., more DCT-components. The amount of generated bits from each coded block is in average restricted to a certain limiting value. This is done to prevent buffer overflow at the transmitter, i.e. to ensure that the whole frame can be coded within a predetermined time. Buffer overflow typically leads to a drop in frame rate. In connection with H.261 coding standard the limiting value is called a quantizer value MQUANT (also called Q-value in short).

The MQUANT value is adjusted at the encoder continuously in order to get to the transmitting buffer in average as much bits as the transmission line can transmit. MQUANT can get values from 1 to 31. The more activity, e.g., the more movement, picture details or noise there is in the video picture, and the lower the bit rate of the transmission channel is, the higher value is typically given to MQUANT. The higher the MQUANT value is, the rougher quantization is used. This leads to a situation where adjacent video pixels having roughly the same numerical value at the encoder side are easily "combined" in the coding process, i.e., after coding they are given the same numerical value (i.e., same color). Rough quantization is used to save transmission capacity for video pixels having a larger mutual difference. If all the pixels in a 8*8 size video block have roughly the same value (i.e., when the luminance signal of every video pixel has roughly the same gray level) the whole block will get the same gray level. When adjacent video blocks have different gray levels, the boundaries between them will become visible. This principal causes the before mentioned blocking effect, which can be discovered by comparing the boundaries, e.g., between the blocks B1, B2, B3 and B4 in FIG. 2B.

The effect is caused by information loss in quantization of DC-coefficients and/or AC-coefficients in the DCT domain. The visibility of blocks (8 by 8 samples) is gained since all blocks are non-overlapping and they are processed independently. The blocking effect is mainly caused by the DCT-domain DC-component fluctuation which raises or lowers the gray level (color signals are handled correspondingly in color systems) of the whole block in the picture domain without affecting the picture content inside the block. In addition, the quantization of low frequency DCT-domain AC-coefficients cause the above described differences in block boundaries. The blocking effect reduction in the prediction loop of the encoder is an optional feature in the H.261 and H.263 standards. The main idea is to reduce the blocking effect in the reference picture, which is internally encoded and decoded, before it is used for prediction.

The main idea of this invented filter is to reduce blocking artefacts without significantly degrading the picture details. This is realized by shifting samples at block boundaries to the reference line, not by low-pass filtering. Low-pass filtering will soften details from the picture, which is an unwanted feature. In the following presented embodiment of the present invention the filter uses three branches (smooth, moderate, and high activity) according to the activity inside adjacent blocks and along the boundary between two adjacent blocks. In the smooth areas three (3) boundary samples (video pixels closest to the boundary between two adjacent blocks) are projected to reference line giving the highest blocking effect reduction but it also has the highest picture resolution and content degradation. In the moderate activity areas two samples are projected and in the high activity areas only one sample is projected, respectively. The high activity branch gives the worst blocking effect reduction but it preserves the picture content best.

Due to the nature of DCT coding the video pixels closer to the center of each video block represent better the original video pixels than video pixels closer to the boundaries between different video blocks. By utilizing this phenomenon it is possible to define a reference line from the numerical value of one certain inner video pixel from one video block to the numerical value of another certain inner video pixel from an adjacent video block. The reference line presents gently the average sloping edge between inner parts of adjacent video blocks. The steepness of the reference line is adjusted to follow the picture content of the video blocks. That means that the reference line becomes steeper at the boundary between high activity blocks (e.g., video blocks having a lot of details and differences in luminance values) and gentle for smoother blocks, respectively. By forwarding the numerical values of the video pixels close to the boundaries towards the reference line, it is possible to fade out the boundaries from the decoded picture. The calculation of the activity of the blocks and the selection of the filtering mode (i.e., the steepness of the reference line) for the edge (branch) are described later in this description.

FIGS. 3A–3F depict the operation of the filter according to the invention using as an example boundary 31 between two adjacent blocks, block 1 and block 2. In the real implementation of the invention all the vertical and horizontal block boundaries are handled in a similar manner. Due to the HVS it has been found out, that if the horizontal boundaries are filtered before the vertical boundaries, the overall quality of the picture seem to be better than if filtering is done in reverse order.

Figure 3A:
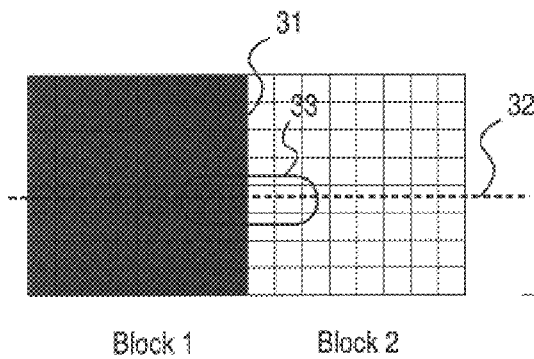
FIG. 3A presents two adjacent video blocks before filtering.
Figure 3B:
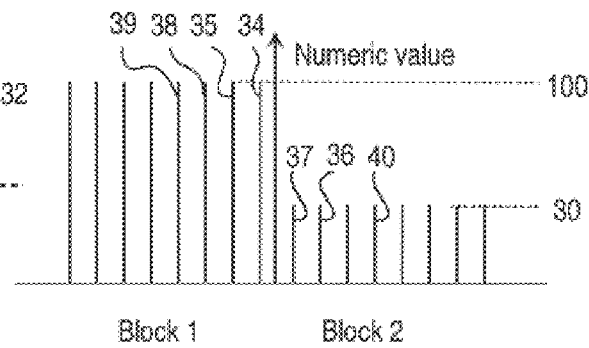
FIG. 3B presents numerical values of individual video pixels at each horizontal pixel row of FIG. 3A, FIGS. 3C, 3D, 3E and 3F present the two adjacent video blocks (FIG. 3A) and their numerical values (FIG. 3B) after being filtered as "high activity area" and "smooth area"

FIG. 3A presents the original block 1 and block 2 before filtering, but after DCT-based video encoding and decoding. After before mentioned processing all the video pixels in block 1 have the same numerical value, let it be 100 in decimal format (see FIG. 3B) in this example, and all the video pixels in block 2 have the same numerical value, let it be 30. That means that all the horizontal pixel rows 32 as well as the numerical values of each video pixel in every horizontal row in FIG. 3A are identical. So the numerical values presented in FIG. 3B are valid also for other horizontal pixels rows within the same video blocks 1 and 2 than for pixel row 32.

The blocking effect reduction is based on projection of boundary samples 33 to the reference line. In this first example we use boundary samples 33, which include four video pixels close to the boundary between block 1 and block 2. In high activity blocks, the value of the outermost sample 34 (having a numerical value of 100) of block 1 (FIG. 3B) is moved to or towards the reference line (ref. 34', FIG. 3D) whereas the reference line itself is defined by the second outermost sample 35 (numerical value 100) as seen from boundary 31 in block 1 and second outermost sample 36 (numerical value 30) in block 2 as seen from boundary 31. The reference line is formed by "drawing" a straight line from the numerical value of sample 35 to the numerical value of sample 36. Similarly, as sample 34, the outermost sample 37 from block 2 is moved to or towards the reference line (ref. 37', FIG. 3D). The numerical values after filtering are approximately 76 for sample 34 and 54 for sample 37. The smoothening of the boundary 31 can be seen from FIG. 3C, where the boundary 31 between block 1 and block 2 is shown after the filtering has been performed also to all the other horizontal pixel rows than pixel row 32.

In moderate activity blocks, the outermost samples are moved to or towards the reference line and the second outermost samples are moved only towards to the reference line (but not all the way to the reference line, the amount of movement is described later in reference with FIG. 4) whereas the reference line itself is defined at one end by the third sample from boundary 31. In the smooth activity blocks, the outermost sample (ref. 34) is moved to or towards the reference line, the second outermost sample (ref. 35) and the third outermost sample (ref. 38) are moved towards to the reference line whereas the reference line itself is defined at the other end by the fourth sample 39 from boundary 31 in block 1 and from fourth sample 40 from boundary 31 in block 2. The numerical values for samples close to the boundary 31 after "smooth" filtering according to the invention are shown in FIG. 3F. After calculation of the linear straight line (reference line) from sample 39 to sample 40 and after the projection of the samples towards the reference line in this specific case the numerical values for each video pixel are 90, 80, 70, 60, 50 and 40 (FIG. 3F) from sample 38 finally to the third outermost sample in block 2. The result after the "smooth" filtering according to the invention has been performed to each pixel row is shown in FIG. 3E.

Figure 3C:
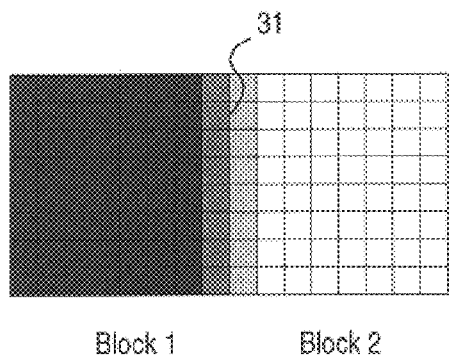
Figure 3D:
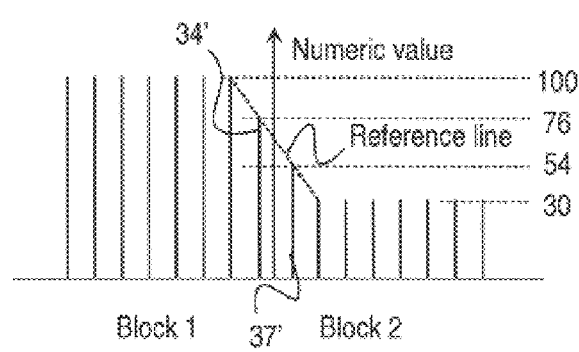
Figure 3E:
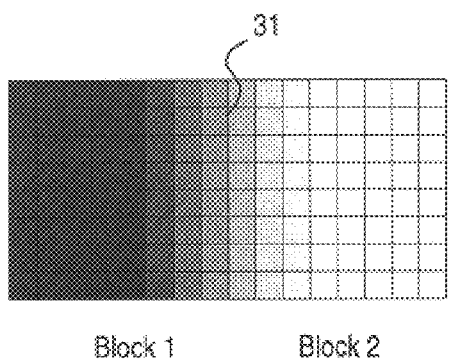
Figure 3F:
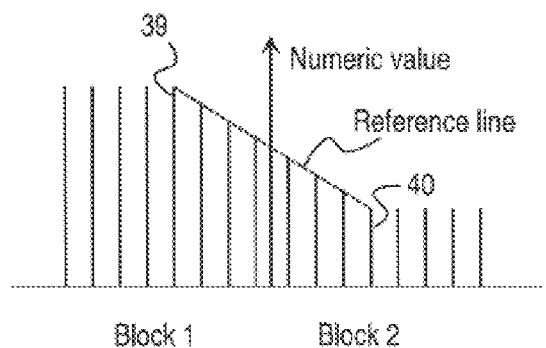
Figure 4:
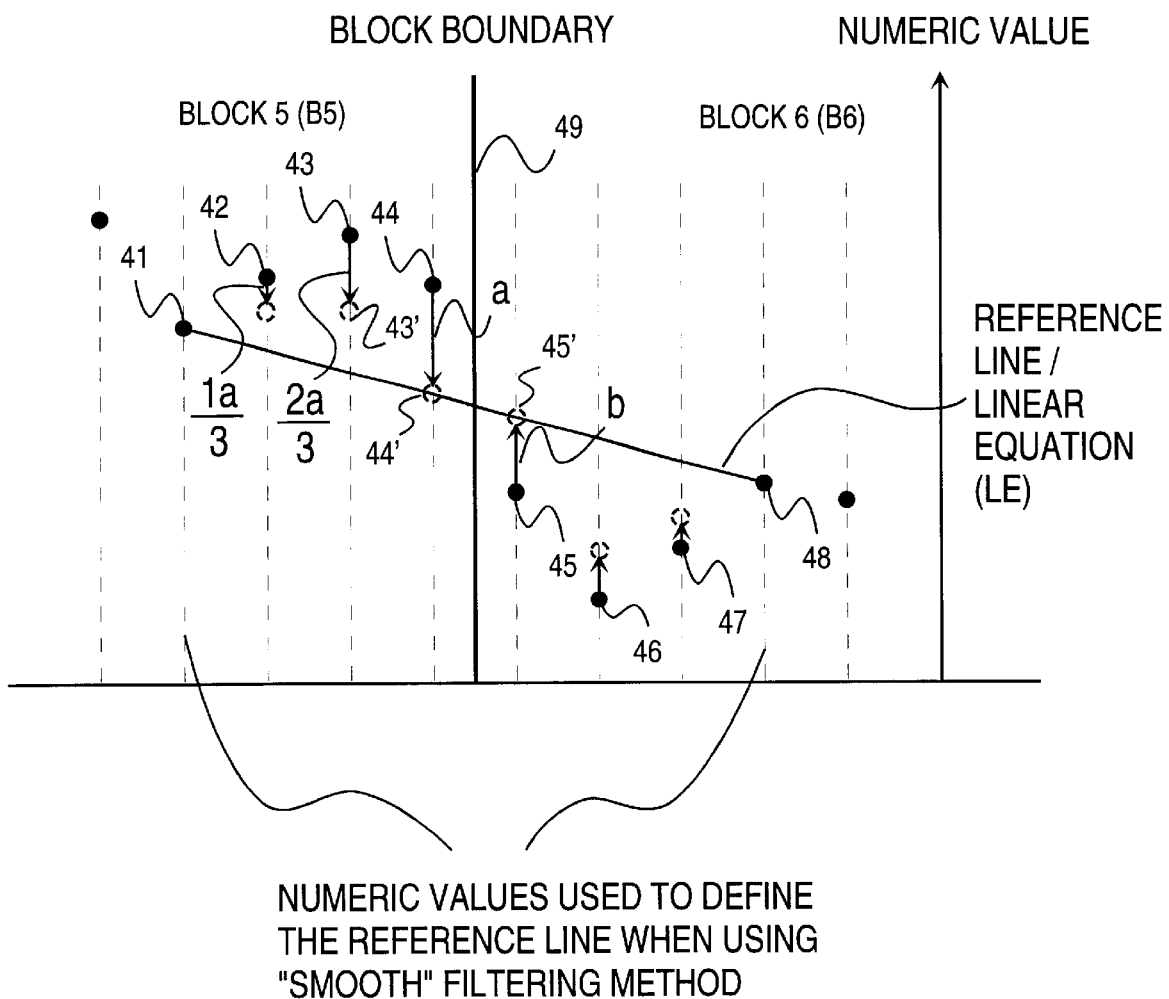
FIG. 4 presents the forwarding of the numerical values of each individual video pixel towards the reference line at the boundary between the adjacent video blocks.

In the above described situation, where both block 1 and block 2 are of one color (or actually of one gray level), it can easily been seen by comparing the FIGS. 3C and 3E, that the "smooth" filter suits better, i.e., the boundary 31 between the blocks 1 and 2 is harder to notice. By increasing the amount of selection branches makes the system more adaptive to the nature of the blocking effect but also increases control logic. A good compromise is three selection branches as described in this exemplary embodiment of the present invention. Of course the invention can be utilized with less than three branches, and between very active blocks the filtering can be totally omitted, as described later in this description.

In the examples shown in FIGS. 3A–3F both block 1 and block 2 had a specific gray level or color within the whole block. This is typical, for example, in situations when the light conditions will change in surroundings having a lot of surfaces of solid one color. To emphasize the operation of the filtering method according to the invention an other type of filtering situation is described. In FIG. 4 there are illustrated the numerical values of each video pixel 41–48 on one horizontal row from block 5 (B5) to block 6 (B6). Basically FIG. 4 corresponds to FIG. 3B, except that each pixel 41, 42, 43, 44 in block 5 close to the boundary 49 between block 5 and block 6 as well as each pixel 45, 46, 47, 48 close to the boundary 49 in block 6 have different numerical values. This is a typical situation in such parts of a video frame which include details and require good resolution. In the following the operation of the filtering method according to the invention is described with reference to FIG. 4 in case the decision to use the "smooth" filtering mode has been made. The selection and meaning of the filtering mode is described later in this description. The method comprises the following steps:

forming and calculation of the reference line (also referred as linear equation, LE) from the forth pixel value 41 from the boundary 49 in block 5 to the fourth pixel value 48 from the boundary 49 in block 6 moving the pixel 44 by the boundary in block 5 to the reference line (circle 44' drawn with dash line), and the measurement of the numerical value a of the movement moving the second pixel 43 from the boundary 49 the amount of ⅔a towards the reference line (ending to circle 43')

moving the third pixel 42 from the boundary 49 the amount of ⅓a towards the reference line moving the pixel 45 by the boundary in block 6 to the reference line (circle 45' drawn with dash line), and the measurement of the numerical value b of the movement moving the second pixel 46 from the boundary 49 the amount of ⅔b and the third pixel 47 from the boundary 49 the amount of ⅓b towards the reference line The filtering method according to the invention is designed to maintain numerical differences between adjacent video pixels in each block, like the differences in numerical values of pixels 41, 42, 43 and 44 in block 5 and correspondingly the differences between pixels 45, 46, 47 and 48. When the differences in the numerical values of the video pixels are preserved, the details in the picture will as well, and the resolution of the video picture will preferably not decrease and small details will not vanish in a disturbingly manner. Instead the numerical values of pixels 44 and 45 by the boundary 49 are brought towards the reference line to fade out the boundary 49 between the blocks 5 and 6.

The selection of which branch ("smooth", "moderate" or "high activity") should be used is based on the measurement of both edge variance and variance inside the block. If the edge variance exceeds the variance inside the adjacent blocks then it is most probable that the blocking effect exists.

It is proper to limit the projection of the video pixels close to the boundary to the reference line to comprise only block boundaries where the edge variance (activity in picture at that area) is higher than variance inside the block. If the edge variance is lower than variance inside the video blocks the boundary most probably wouldn't be visible. It is not proper to use a thresholding value because thresholding brings always problems to terms of robustness of the algorithm. There would be video block boundaries side by side which are processed and not processed. The resulting picture would not be consistent and would be very unpleasant for viewer. Unfortunately, the decision is still hard which means that a block boundary that is processed in a picture will not be processed in the next one. This artefact is a consequence of the changes in the value of the quantization factor MQUANT from one video block to another. To alleviate this kind of hard limiting the used value of quantization factor MQUANT has been added to the conditional clause based on which the decision of what filtering method, if any, is used. See equation (2). This guarantees that higher edges are processed when the processing can be performed with a lower risk of making errors (if the MQUANT has a high value there probably won't be details in the picture that could vanish during filtering process) and when the need for processing is high (the higher value MQUANT gets the more probably blocking effect exists).

It is profitable to outline the filtering method according to the invention only to boundaries around which the variance inside video blocks is lower than a threshold value. In the case of edges, for instance, the experiments have shown that the edges the individual video pixels of which have a lower mutual numerical value difference than 20 are safe to be processed, because the HVS hardly notices level changes lower than 20. The limiting by inside variance using a threshold value does not introduce problems like edge thresholding. It only excludes high picture content areas (e.g., details in picture) which are unsafe to be modified and which do not enhance the quality of the picture.

Each three filtering branches used in this embodiment of the invention have a similar conditional clause for processing, according to equation (2) below $$\text{IF} \begin{pmatrix} (activity_{IN} \langle activity_{EDGE} + MQUANT \rangle) \\ \text{AND} \\ (activity_{IN} \langle THRESHOLD_{IN} \rangle) \end{pmatrix} = \text{TRUE} \quad (2)$$

where
  $activity_{IN}$ is a variance inside the block,
  $activity_{EDGE}$ is a variance over the edge between adjacent blocks,
  $THRESHOLD_{IN}$ is a threshold value, a good value for it is 20,
  MQUANT is a quantization value for the block under processing.

As said before, three different branches are used for classification of the different picture areas in this exemplary embodiment of the present invention: "smooth", "moderate", and "high activity", and the filter is adjusted accordingly. The main idea behind branch selection is the usage of the exactly same conditional clause, i.e. equation (2), which is used to define whether filtering is used at the boundary between adjacent video blocks or not, also to define the optimal filtering method. The branch selection is based on a method in which a different priority is given to different branches when calculating the realization of equation (2). In practice this is carried out in such a way that a different amount of samples (individual video pixels in the adjacent video blocks) are used in calculations of the variance inside the block ($activity_{IN}$) for each branch. A calculation of variance over the edge ($activity_{EDGE}$) is always similar in each branch. The "smooth area", i.e. low activity area, is tested first, "moderate activity area" next, and "high active area" last. The amount of samples used in calculation of the variance inside the video block is largest for "smooth area", moderate for "moderate activity area" and smallest for "high activity area" This order is evident because the processing qualification for "smooth area" is the tightest (more video pixels the numerical values of which are examined) and "high activity area" is the loosest. To adapt branch selections properly to picture content, the amount of samples for variance inside the block are depicted as dots in the FIGS. 5A, 5B and 5C. Figures depict an example in which the amount of samples used in calculation of equation (2) varies in horizontal direction between branches. In vertical dimension three samples is fixed sample amount.

Normal variance calculation is an exhausting operation, and performed according to equation 3.

$$S = \frac{1}{N-1} \sum_{i=1}^{N} (x_i - \bar{x})^2 \quad (3)$$

where
  x. is a numerical picture value of each individual video pixel, and
  $\bar{x}$ is the mean value of all N samples.

The variance can be estimated by a more simple method called min-max approximation. This method defines the variance as $$\hat{S}_{IN} = x_{max} - x_{min} \quad (4)$$

where
  $x_{max}$ is the largest one of numerical picture values of the video pixels inside the picture area under examination, and
  $x_{min}$ is the smallest one.

In the case of inside block variance all samples can be used without additional pre-filtering. When calculating edge variance, it is better to take difference over the edge by weighted difference filter, see equation (5)

$$\hat{S}_{EDGE} = (x_7^k + 3 \cdot x_8^k) - (3 \cdot x_1^{k+1} + x_2^{k+1}) \quad (5)$$

where
  $x_i^k$ is $i^{th}$ sample in the block k (from left to right in horizontal direction and from up to down in vertical direction)

This filter creates difference over the edge by weighting outermost boundary samples by 3 and next inner samples by 1.

Figure 5A:
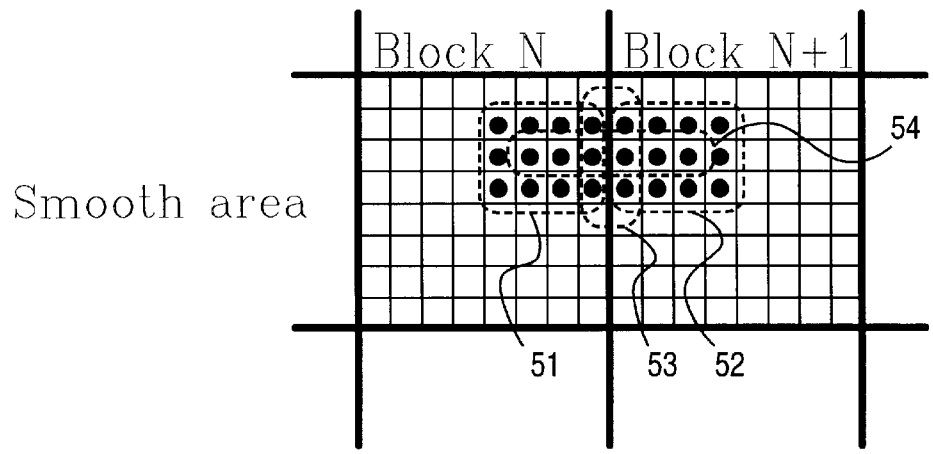
FIGS. 5A, 5B and 5C present pixel areas which are used for calculation of picture activity with "smooth area", "moderate activity area" and "high activity area" and the pixels to which the filtering is focused.
Figure 5B:
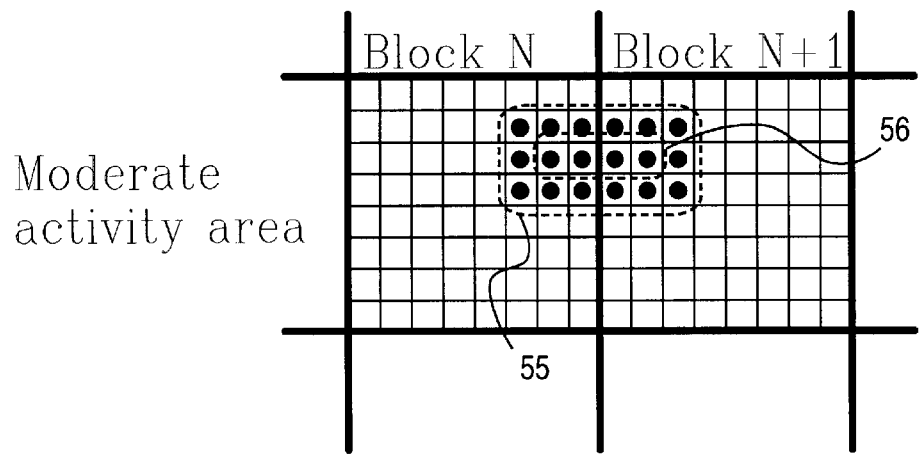
Figure 5C:
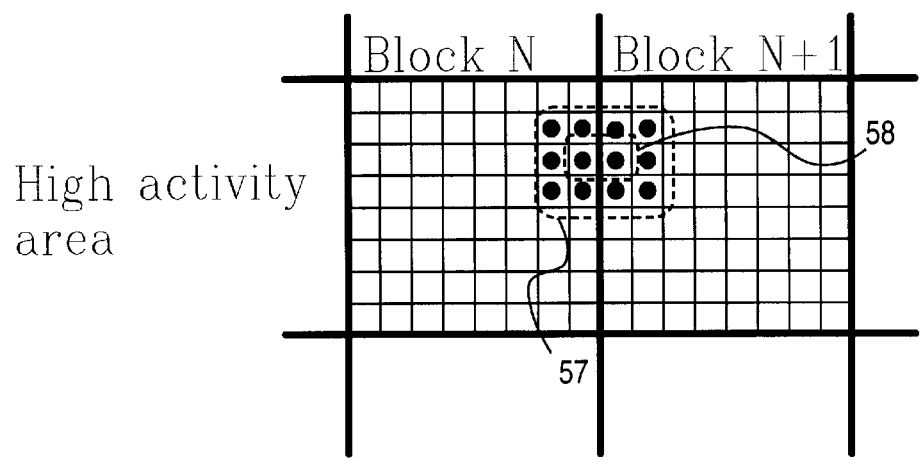
Figure 6:
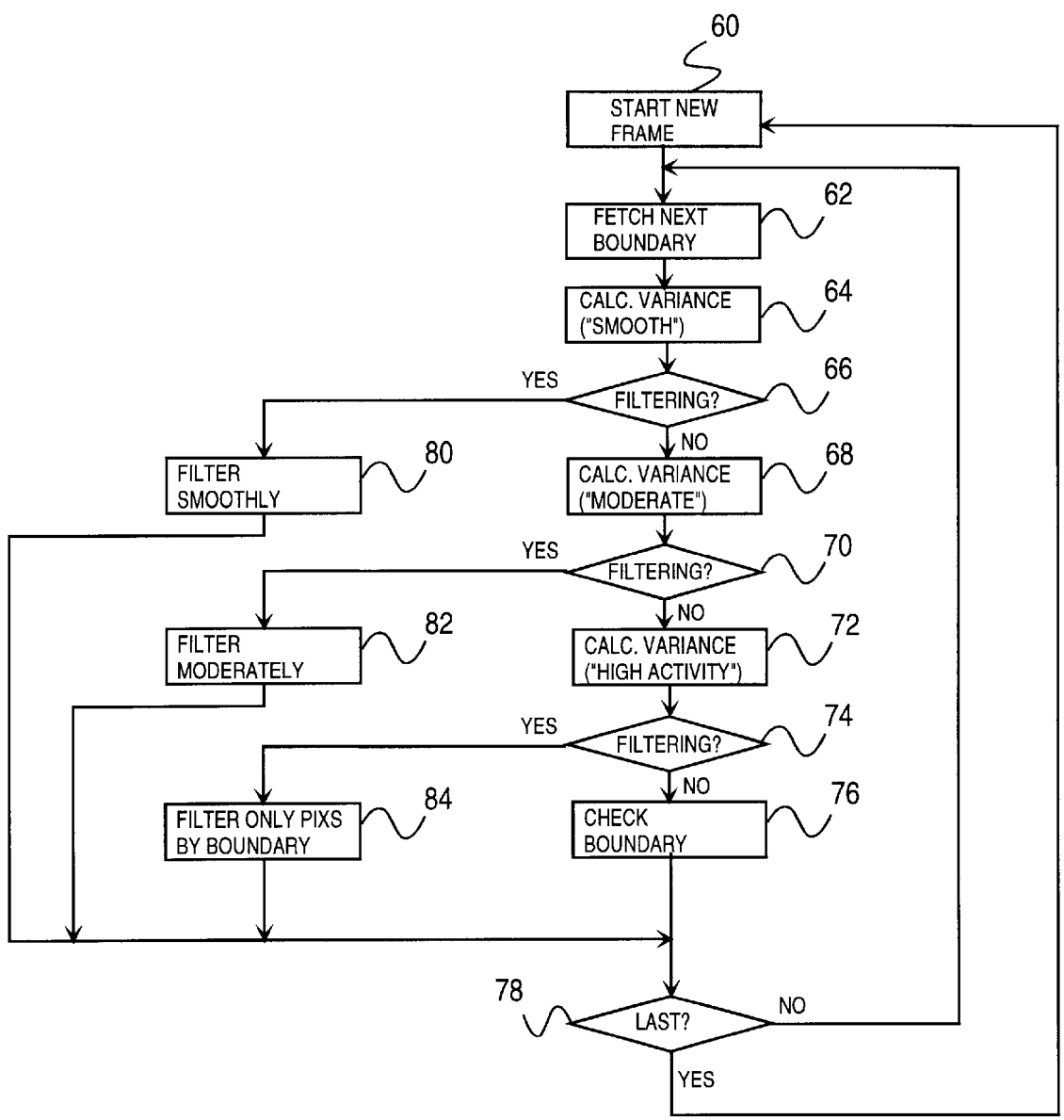
FIG. 6 presents as a block diagram the selection process of the used filtering method according to the invention.
Figure 7:
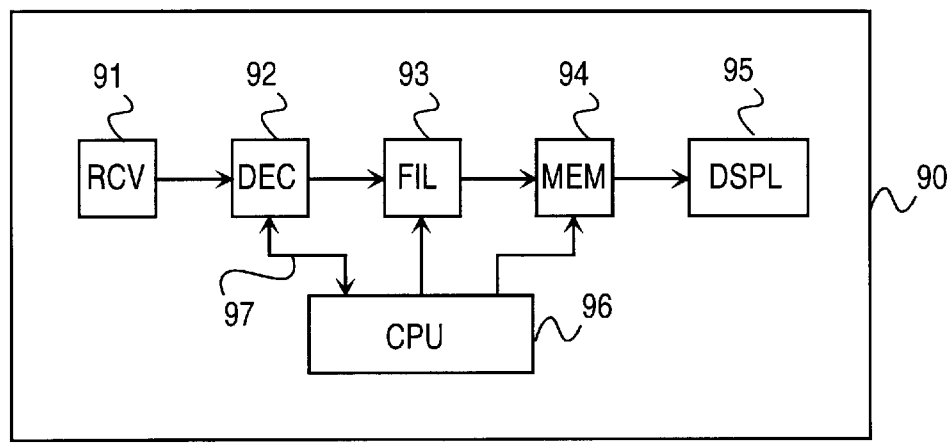
FIG. 7 presents components of a terminal device according to the invention.
Figure 8:
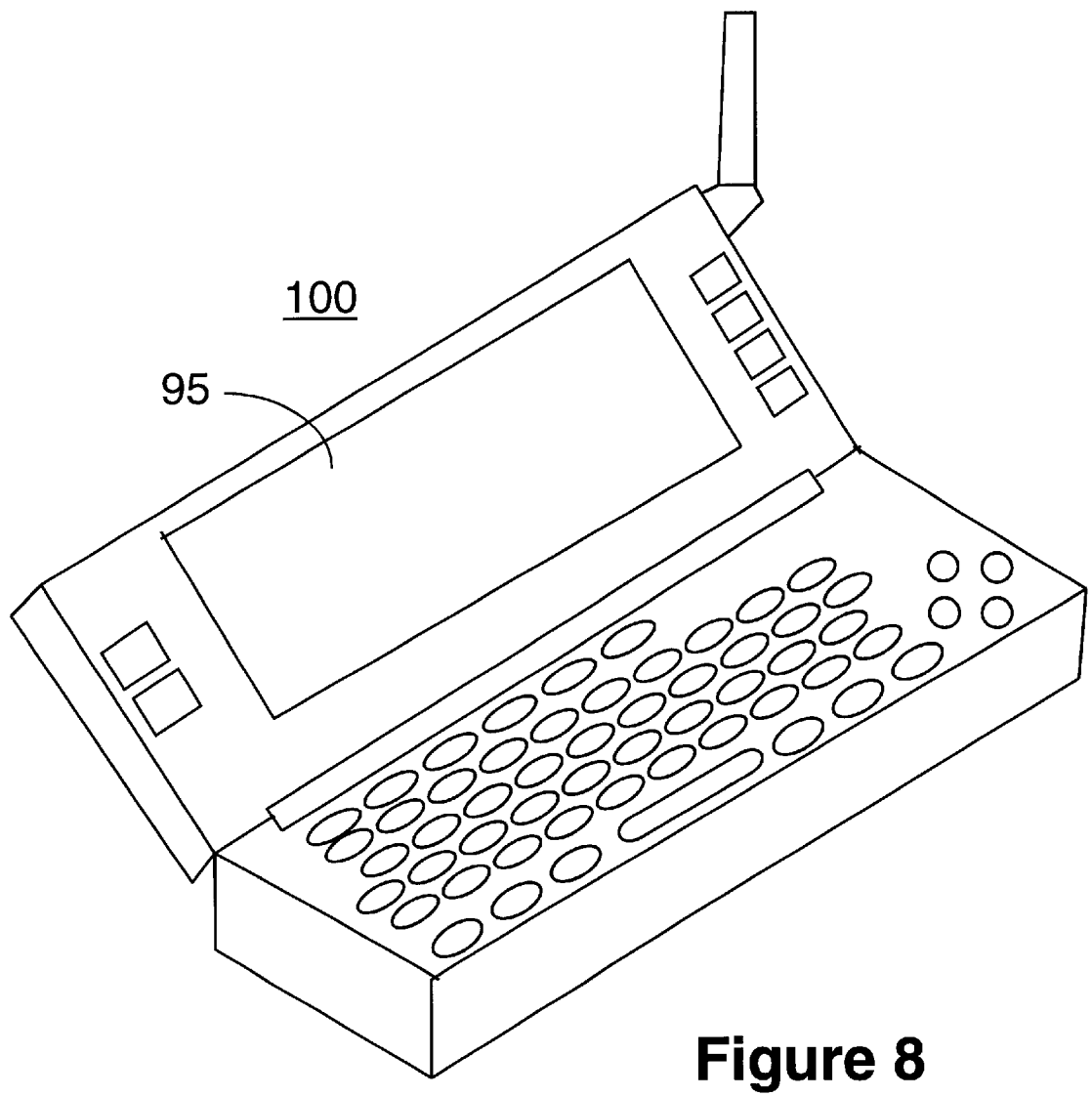
FIG. 8 presents an embodiment of a mobile terminal according to the invention.

By taking into count the before described equations (2)–(5) and FIGS. 5A, 5B and 5C we can form a logical flow chart illustrating the filtering method according to the invention. The flow chart is presented in FIG. 6. The filtering process can be done after the whole video frame is loaded to the picture memory, but preferably the filtering can be done during the decoding of the received video bit stream. An illustrative embodiment of a terminal device 90 according to the invention utilizing this method is presented in FIG. 7. The terminal device 90, which can be for example a mobile terminal 100 according to the FIG. 8, comprises among other things a receiving part 91, a decoder 92, a filter 93, a memory 94 and a display unit 95. The decoder 92, filter 93 and the memory 94 are controlled by the central processing unit 96. In case of a mobile terminal 100 the receiving part includes a RF-unit for receiving the compressed video signal via a mobile communication network. FIG. 8 presents a Nokia 9000 Communicator type of a mobile terminal having a large display 95 for presenting video picture.

In block 60 (FIG. 6) the filtering process according to the invention is started for a new video frame. Block 62 stores the information about the last processed bit locations, and focuses the filtering process along the block boundaries, for example from top to bottom for each vertical boundary and after that from left to right for each horizontal boundary.

In block 64 the first filter check is done using the "smooth" criterion. That means that the calculation of variance inside the block N (FIG. 5A) is done using, e.g., the 12 video pixels (ref. 51), marked with black circles, using formula (4). If for example the smallest numerical value among the 12 video pixels is 60 and the largest 66, the variance will be 6. Similarly the variance calculation is done to the 12 corresponding blocks (ref. 52) in block N+1. Let us assume that the smallest numerical value is 62 and largest 70 giving the variance of 8. From these two variance values 6 and 8 we can select either one, or their average, into the comparison to the variance at the boundary, which is calculated using formula (5). For the calculation of the variance at the boundary the 6 pixel's (ref. 53) numerical values are used. After calculation of the variance parameters activity$_{IN}$ and activity$_{EDGE}$, their values are put into equation (2) together with THRESHOLD$_{IN}$ and MQUANT (gained from the decoder 92 via channel 97, FIG. 7). If the equation (2) is true (checked in diamond shaped block 66), the filtering method according to the invention is used in block 80 for the 6 pixels (ref. 54 in FIG. 5A) as described in connection with FIGS. 3E, 3F and 4. After that it is checked weather the pixels which were filtered where the last ones in block 78. If not, the process continues from block 62, if they where, the process continues from block 60 by taking a new video frame. If the equation (2) is not true, the procedure continues from block 68.

In block 68 the calculation of activity$_{IN}$ for blocks N and N+1 is done using the numerical values of the pixels 55 in a similar manner as in block 64 but with the difference that the amount of pixels used in calculation is smaller. Instead for the calculation of activity$_{EDGE}$ the same pixels (ref. 53 in FIG. 5A) are used, so the calculation need not be done again if the value of activity$_{EDGE}$ was already stored in the memory, which is logical. The obtained numerical values are put into equation (2) and the equation is calculated. If it is true the filtering for the four pixels (ref. 56) is done in block 82 using "moderate activity method", otherwise the performance of the procedure continues from block 72. In block 72 the determination either the filtering using "high activity method" is done for the pixels 58 or not is done using the same calculation principle for pixels 57. If even the last filtering step 74 gives the result that filtering can not be performed, the operation continues without filtering at all from block 76, where the next boundary is defined. The before described filtering process is done for all the boundaries in each video frame—the contents of each video frame defines how many pixels by boundary are processed, and using which filtering method.

The paper presented a realization of an invention and some embodiments with the help of examples. It is obvious to a person skilled in the art, that the present invention is not restricted to details of the embodiments presented above, and that the invention can also be realized in another form without deviating from the characteristics of the invention. The presented embodiments should be considered illustrative but not restricting. Thus the possibilities for realization and use of the invention are limited only by the enclosed claims. Consequently, the various options of realizing the invention as determined by the claims, including the equivalent realizations, also belong to the scope of the invention.

What is claimed is:

1. A method of filtering a received digital video picture, in which said digital video picture comprises video blocks, each video block comprising a certain amount of individual video pixels, each video pixel having a numerical value defining a property of the video pixel and having a certain location in the video picture, and in which video picture a first video block and a second video block located adjacent to the first video block define a boundary therebetween, the method comprising the steps of:

selecting a first video pixel from the first video block in such a way that the first video pixel is located at the boundary in the first video block to obtain a first boundary video pixel, selecting a second video pixel from the second video block in such a way that the second video pixel is located at the boundary in the second video block to obtain a second boundary video pixel, selecting a first reference video pixel in the first video block and a second reference video pixel in the second video block, the first reference video pixel and the second reference video pixel being other than the first boundary video pixel and the second boundary video pixel and the first reference video pixel and the second reference video pixel being placed closer to a central portion of each of said video blocks than the respective boundary video pixel, in such a way that the reference video pixels and the boundary video pixels are situated on a straight line, the straight line being transverse to the boundary, drawn from the first reference video pixel to the second reference video pixel, wherein the first and the second boundary video pixels are located between the first and the second reference video pixels on the straight line, defining a linear equation, using the numerical values of the reference video pixels, the linear equation giving as a solution a numerical reference value to each boundary video pixel on said straight line and filtering at least one boundary video pixel by adjusting the numerical value of the at least one boundary video pixel towards the reference value of the at least one boundary video pixel.

2. A filtering method according to the claim 1, wherein the linear equation comprises a reference line.

3. A filtering method according, to the claim 2, wherein the reference line comprises a straight line defined from the numerical value of the first reference video pixel to the numerical value of the second reference video pixel.

4. A filtering method according to the claim 3, wherein the step of filtering the at least one boundary video pixel comprises adjusting the numerical value of the at least one boundary video pixel towards the numerical value of the reference line at the location of the at least one boundary video pixel.

5. A filtering method according to the claim 1, wherein a third video pixel is selected from the first video block and a fourth video pixel is selected from the second video block in such a way that the third video pixel is situated on the straight line between the first reference video pixel and the first boundary video pixel and the fourth video pixel is situaced on said straight line between the second boundary video pixel and the second reference video pixel, the numerical value of the third video pixel is adjusted a first amount, and the numerical value of the fourth video pixel is adjusted a second amount.

6. A filtering method according to the claim 5, wherein the first amount is defined based on the adjustment of the numerical value of the at least one boundary video pixel, and the adjustment of the numerical value of the at least one boundary video pixel is multiplied by a fraction resulting in the first amount, and the second amount is defined based on the adjustment of the numerical value of the second boundary video pixel, and the adjustment of the numerical value of the second boundary video pixel is multiplied by a fraction resulting in the second amount.

7. A filtering method according to the claim 1, wherein a decision on whether the filtering method is used or not and for which video pixels the filtering is used is done on basis of an activity inside the first video block, an activity inside the second video block and an activity at the boundary between the first video block and the second video block.

8. A filtering method according to the claim 7, wherein the decision is based on the following equation $$\text{IF} \begin{pmatrix} (activity_{IN} < activity_{EDGE} + MQUANT) \\ \text{AND} \\ (activity_{IN} < THRESHOLD_{IN}) \end{pmatrix} = \text{TRUE}$$

in which $activity_{IN}$ is the variance inside the first video block and the second video block, $activity_{EDGE}$ is the variance over the edge between the first video block and the second video block, and $THRESHOLD_{IN}$ is a threshold value, and MQUANT is a quantizer value.

9. A filtering method according to claim 1, wherein the reference value of each boundary video pixel is computed as a function of the location of the boundary video pixel on the straight line.

10. A terminal device for filtering a received digital video picture, which said digital video picture comprises video blocks, each video block comprises a certain amount of individual video pixels, each video pixel having a numerical value defining a property of the video pixel and having a certain location in the video picture, in which video picture a first video block and a second video block located adjacent the first video block define a boundary therebetween, and the terminal device comprising:

means for selecting a first video pixel from the first video block in such a way that the first video pixel is located at the boundary in the first video block to obtain a first boundary video pixel, means for selecting a second video pixel from the second video block in such a way that the second video pixel is located at the boundary in the second video block to obtain a second boundary video pixel, means for selecting a first reference video pixel in the first video block and a second reference video pixel in the second video block, the first reference video pixel and the second reference video pixel being other than the first boundary video pixel and the second boundary video pixel and the first reference video pixel and the second reference video pixel being placed closer to a central portion of each of said video blocks than the respective boundary video pixel, in such a way that the reference video pixels and the boundary video pixels are situated on a straight line, the straight line being transverse to the boundary, drawn from the first reference video pixel to the second reference video pixel, wherein the first and the second boundary video pixels are located between the first and the second reference video pixels on the straight line, means for defining a linear equation using the numerical values of the reference video pixels, the linear equation giving as a solution a numerical reference value to each boundary video pixel on said straight line, and means for filtering at least one boundary video pixel by adjusting the numerical value of the at least one boundary video pixel towards the reference value of the at least one boundary video pixel.

11. A terminal device according to the claim 10, wherein the receiver terminal comprises receiving means for receiving the video picture via a mobile communication network.

12. A filtering method according to claim 10, wherein the reference value of each boundary video pixel is computed as a function of the location of the boundary video pixel on the straight line.

13. A method of filtering a received video picture, in which a digital video picture is received, the video picture comprising video blocks, each video block comprising a certain amount of individual video pixels, each video pixel having a numerical value defining a property of the video pixel and having a certain location in the video picture, and in which video picture a first video block and a second video block located adjacent the first video block define a boundary therebetween, a first video pixel from the first video block and a second video pixel from a second video block are selected in such a way that they are adjacent each other on the opposite sides of the boundary, and the first video pixel and the second video pixel are filtered, wherein a first reference video pixel is selected in the first video block and a second reference video pixel is selected in the second video block in such a way that the first reference pixel, the first video pixel, the second video pixel and the second reference pixel are situated on a straight line, perpendicular to the boundary, drawn from the first reference video pixel to the second reference video pixel, a linear equation is defined, the linear equation giving as a solution a numerical reference value to each pixel on said straight line as a function of the location of the pixel on said straight line, and the filtering is performed by adjusting the numerical value of the first video pixel towards its reference value, and by adjusting the numerical value of the second video pixel towards its reference value, and further wherein a decision on whether the filtering method is used or not and for which video pixels the filtering is used is done on basis of activity inside the first video block, activity inside the second video block and activity at the boundary between the first video block and the second video block, and wherein, the decision is based on the following equation $$IF \begin{pmatrix} (activity_{IN} < activity_{EDGE} + MQUANT) \\ AND \\ (activity_{IN} < THRESHOLD_{IN}) \end{pmatrix} = TRUE$$

in which $activity_{IN}$ is the variance inside the video block one and the video block two, $activity_{EDGE}$ is the variance over the edge between the adjacent video block one and video block two, and $THRESHOLD_{IN}$ is a Threshold value, and MQUANT is a quantizer value.

14. A method of filtering a received digital video picture, in which said digital video picture is coded into video blocks, each video block comprising a certain amount of individual video pixels, each of said video pixels having a numerical value defining a property of the video pixel and having a certain location in the video picture, and in which video picture, a first video block is located adjacent to a second video block to define a boundary therebetween, the method comprising the steps of:

selecting a first reference video pixel in the first video block and a second reference video pixel in the second video block, the first reference video pixel and the second reference video pixel being displaced away from said boundary towards a central portion of each of said video blocks, said reference video pixels defining a straight line of video pixels transverse to said boundary, between said first reference video pixel and said second reference video pixel, wherein said straight line includes at least a first and a second adjustment video pixel located between the first and the second reference video pixels and said boundary;

defining a linear equation representing a video pixel value reference ine transverse to said boundary, said linear equation defined relative to the change in pixel values from said first reference pixel in said first video block to said second reference pixel in said second video block;

adjusting the numerical value of said at least first and second adjustment video pixels towards said pixel value reference line according to the position of said at least first and second adjustment video pixels from said boundary.

* * * * *